(12) United States Patent
Lee et al.

(10) Patent No.: US 8,343,388 B2
(45) Date of Patent: *Jan. 1, 2013

(54) ELECTRODE HAVING POROUS ACTIVE COATING LAYER, MANUFACTURING METHOD THEREOF AND ELECTROCHEMICAL DEVICE CONTAINING THE SAME

(75) Inventors: Sang-Young Lee, Daejeon (KR); Seok-Koo Kim, Daejeon (KR); Jong-Hyeok Park, Daejeon (KR); Jang-Hyuk Hong, Daejeon (KR); Byoung-Jin Shin, Busan (KR)

(73) Assignee: LG Chem, Ltd. (KR)

( * ) Notice: Subject to any disclaimer, the term of this patent is extended or adjusted under 35 U.S.C. 154(b) by 792 days.

This patent is subject to a terminal disclaimer.

(21) Appl. No.: 12/225,029

(22) PCT Filed: Mar. 6, 2007

(86) PCT No.: PCT/KR2007/001095
§ 371 (c)(1),
(2), (4) Date: Mar. 9, 2009

(87) PCT Pub. No.: WO2007/105869
PCT Pub. Date: Sep. 20, 2007

(65) Prior Publication Data
US 2009/0305141 A1    Dec. 10, 2009

(30) Foreign Application Priority Data

Mar. 10, 2006 (KR) .................. 10-2006-0022587

(51) Int. Cl.
*H01B 1/12* (2006.01)
*H01B 1/08* (2006.01)

(52) U.S. Cl. ......... 252/519.33; 252/519.12; 252/519.32; 252/520.21; 427/232; 427/247; 427/58

(58) Field of Classification Search ............. 252/519.33, 252/519.12, 519.32, 520.21; 429/232, 247, 429/58

See application file for complete search history.

(56) References Cited

U.S. PATENT DOCUMENTS

| 6,096,453 | A | 8/2000 | Grunwald |
| 6,287,728 | B1 | 9/2001 | Kajiura et al. |
| 6,432,586 | B1 | 8/2002 | Zhang |
| 2005/0266150 | A1 | 12/2005 | Yong et al. |
| 2008/0311479 | A1* | 12/2008 | Lee et al. ................. 429/232 |
| 2010/0261047 | A1* | 10/2010 | Kim et al. ................. 429/144 |

FOREIGN PATENT DOCUMENTS

| EP | 1643583 A1 | 4/2006 |
| JP | 10233232 A | 9/1998 |
| WO | 2005076388 A1 | 8/2005 |
| WO | 2007/066966 A1 | 6/2007 |

OTHER PUBLICATIONS

International Search Report and Written Opinion, PCT/KR2007/001095, dated Jun. 26, 2007.

* cited by examiner

*Primary Examiner* — Douglas Mc Ginty
(74) *Attorney, Agent, or Firm* — Lerner, David, Littenberg, Krumholz & Mentlik, LLP

(57) ABSTRACT

Disclosed are an electrode having a porous active coating layer, a manufacturing method thereof and an electrochemical device containing the same. The electrode having a porous active coating layer according to the present invention may be useful to enhance peeling and scratch resistances of the porous active layer and improve a lamination characteristic toward the porous active layer by introducing a porous active layer onto a porous substrate having pores, the porous active layer having heterogeneity of morphology toward a thickness direction in which a content ratio of the binder polymer/inorganic particles present in a surface layer is higher than that of the binder polymer/inorganic particles present inside the surface layer. Accordingly, the stability and performances of the battery can be improved at the same time since the detachment of the inorganic particles from the porous active layer may be reduced during the assembly process of the electrochemical device.

12 Claims, 3 Drawing Sheets

(a)           (b)

(a)

(b)

(a)

(b)

ELECTRODE HAVING POROUS ACTIVE COATING LAYER, MANUFACTURING METHOD THEREOF AND ELECTROCHEMICAL DEVICE CONTAINING THE SAME

TECHNICAL FIELD

The present invention relates to an electrode of an electrochemical device such as a lithium secondary battery, a manufacturing method thereof and an electrochemical device containing the same, and more particularly to an electrode having a porous active coating layer having a mixture of inorganic materials and polymers formed on a surface of the electrode, a manufacturing method thereof and an electrochemical device containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, the research and development into a novel electrode and a novel battery that can improve capacity density and specific energy have been made intensively in the field of the secondary batteries.

Among currently used secondary batteries, lithium secondary batteries developed in early 1990's have a higher drive voltage and a much higher energy density than those of conventional batteries using an aqueous electrolyte solution (such as Ni-MH batteries, Ni—Cd batteries, $H_2SO_4$—Pb batteries, etc). For these reasons, the lithium secondary batteries have been advantageously used. However, such a lithium secondary battery has disadvantages in that organic electrolytes used therein may cause safety-related problems resulting in ignition and explosion of the batteries and that processes for manufacturing such a battery are complicated.

Recently, lithium-ion polymer batteries have been considered as one of the next-generation batteries since the above disadvantages of the lithium ion batteries were solved. However, the lithium-ion polymer batteries have a relatively lower battery capacity than those of the lithium ion batteries and an insufficient discharging capacity in low temperature, and therefore these disadvantages of the lithium-ion polymer batteries remain to be urgently solved.

Such a battery has been produced from many companies, and the battery stability has different phases in the lithium-ion polymer batteries. Accordingly, it is important to evaluate and ensure the stability of the lithium-ion polymer batteries. First of all, it should be considered that errors in operation of the batteries should not cause damage to users. For this purpose, the Safety and Regulation strictly regulate the ignition and the smoking in the batteries.

The lithium secondary battery is short-circuited due to the contact between a cathode and an anode, leading to its explosion with extreme high-temperature heat. The contact between the cathode and the anode may be made, for example, if a porous separator is contracted or melted by the overheat of the battery or penetrated due to the external impacts.

In order to solve the above battery safety-related problem, there has been proposed an electrode having a porous active layer formed by coating at least one surface of an anode or a cathode, and both electrodes with a mixture of inorganic particles and a binder polymer. The conventional porous active layer coated on the electrode shows homogeneous composition morphology toward a thickness direction, as shown in FIG. 2B and FIG. 3B. However, if the electrochemical device is assembled with the electrode having a porous active coating layer, it has disadvantages in that the inorganic particles in the porous active layer are detached during the assembly process such as winding, etc. and a lamination characteristic toward a separator is deteriorated in using a separate porous separator. In order to solve the above disadvantages, if a content of a binder polymer in the porous active layer is increased, characteristics such as the peeling and scratch resistances, the lamination characteristic toward a separator, etc. in the assembly process of the electrochemical device may be rather improved. However, porosities in the porous active layer are decreased since the increase in the content of the binder polymer leads to relative reduction in the content of the inorganic particles, resulting in deteriorated performances of the electrochemical device.

DISCLOSURE OF INVENTION

The present invention is designed to solve the problems of the prior art, and therefore the first object of the invention is to provide an organic/inorganic composite separator capable of improving characteristics in an assembly process of an electrochemical device without any increase in the content of a binder polymer so that porosity of a porous active coating layer formed on at least one surface of the electrode can be maintained in a sufficient degree, a manufacturing method thereof and an electrochemical device containing the same.

The present invention is designed to solve the problems of the prior art, and therefore the second object of the invention is to provide a method for manufacturing an electrode having a porous active coating layer, the electrode exhibiting the characteristics as described in the first object by undergoing only one coating process.

In order to accomplish the first object, the present invention provides an electrode having a porous active coating layer, including: (a) an electrode; and (b) a porous active coating layer formed on at least one surface of the electrode and having a mixture of a plurality of inorganic particles and a binder polymer formed thereon, wherein the porous active layer shows heterogeneity of composition morphology toward a thickness direction in which a content ratio of the binder polymer/inorganic particles present in a surface region of the porous active layer is higher than that of the binder polymer/inorganic particles present inside the porous active layer, a manufacturing method thereof, and an electrochemical device containing the porous active layer.

As described above, the electrode having a porous active coating layer according to the present invention enhances peeling and scratch resistances of the porous active coating layer by introducing a porous active layer onto the electrode, the porous active layer having heterogeneity of morphology toward a thickness direction in which a content ratio of the binder polymer/inorganic particles present in a surface layer is higher than that of the binder polymer/inorganic particles present inside the surface layer. Also, the electrode of the present invention may improve a lamination characteristic toward electrodes in using a separate porous separator. Accordingly, stability and performances of the battery can be improved together since it is possible to reduce the detachment of inorganic particles from the porous active layer during the assembly process of the electrochemical device.

In the electrode having a porous active coating layer according to the present invention, a first binder polymer is preferably used as the binder polymer, the first binder polymer containing together at least one functional group selected from the group consisting of carboxy, maleic anhydride and hydroxy; and at least one functional group selected from the group consisting of cyano and acrylate. Such a first binder polymer may include cyanoethylpullulan, cyanoethylpolyvinylalcohol, cyanoethylcellulose, cyanoethylsucrose, etc.

In the electrode having a porous active coating layer according to the present invention, a second binder polymer having a solubility parameter of 17 to 27 $MPa^{1/2}$ is preferably used as the binder polymer together with the above-mentioned binder polymer in the aspect of electrochemical stability of the porous coating layer. Such a second binder polymer includes polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, etc.

In order to accomplish the second object, the present invention provides a method for manufacturing an electrode having a porous active coating layer, the method including: (S1) preparing a solution of a first binder polymer containing together at least one functional group selected from the group consisting of carboxy, maleic anhydride and hydroxy; and at least one functional group selected from the group consisting of cyano and acrylate; (S2) adding inorganic particles to the solution of the first binder polymer and dispersing the inorganic particles in the solution of the first binder polymer; (S3) coating the solution of the first binder polymer having inorganic particles dispersed therein with an electrode and drying the coated electrode, wherein the porous active coating layer shows heterogeneity of composition morphology toward a thickness direction in which a content ratio of the first binder polymer/inorganic particles present in a surface region of the porous active layer is higher than that of the first binder polymer/inorganic particles present inside the porous active layer.

In the method for manufacturing an electrode having a porous active coating layer according to the present invention, it is preferred in the aspect of electrochemical stability of the porous active coating layer to further add and dissolve the second binder polymer in the solution of the first binder polymer, wherein the second binder polymer has a solubility parameter of 17 to 27 $MPa^{1/2}$.

BRIEF DESCRIPTION OF THE DRAWINGS

These and other features, aspects, and advantages of preferred embodiments of the present invention will be more fully described in the following detailed description, taken accompanying drawings.

FIG. 2A is a magnified photograph showing a surface of the porous active layer having heterogeneity of morphology toward a thickness direction prepared in Example 1, and FIG. 2B is a magnified photograph showing a surface of a conventional porous active layer.

FIG. 3A is a magnified photograph showing a surface of the porous active layer having heterogeneity of morphology toward a thickness direction prepared in Example 1, and FIG. 3B is a magnified photograph showing a surface of a conventional porous active layer.

FIG. 4A is a photograph showing a lamination test result of the electrode having a porous active coating layer prepared in Example 1, wherein the porous active coating layer has heterogeneity of morphology toward a thickness direction, and FIG. 4B is a photograph showing a lamination test result of the conventional electrode having a porous active coating layer.

BEST MODES FOR CARRYING OUT THE INVENTION

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Unlike conventional electrodes and having a porous active coating layer which is formed on the electrode and simply shows homogeneous morphology toward a thickness direction, the present invention provides an electrode having a porous active coating layer that shows heterogeneity of composition morphology toward a thickness direction in which a content ratio of the binder polymer/inorganic particles present in a surface region of the porous active layer is higher than that of the binder polymer/inorganic particles present inside the porous active layer.

Figure 1:
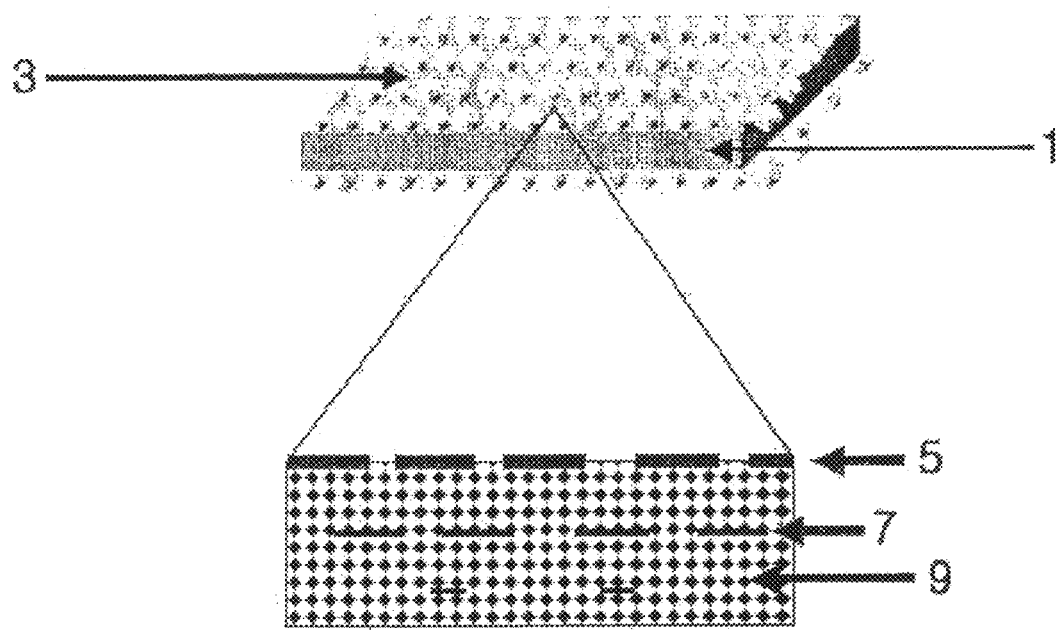
FIG. 1 is a diagram showing a cross-sectional view of an electrode having a porous active coating layer according to the present invention and a schematic view of a porous active layer having heterogeneity of morphology toward a thickness direction, respectively.

1) As shown in FIG. 1, the electrode having a porous active coating layer according to the present invention includes an electrodes such as a cathode or an anode; and a porous active coating layer 3 formed in at least one surface of the porous substrate 1, wherein the porous active layer 3 includes a polymer 5 and inorganic particles 9, the content ratios of the a polymer 5 and the inorganic particles 9 are varied toward a thickness direction. Accordingly, the electrode having a porous active coating layer has increased resistances to external stimuli such as a peeling resistance, a scratch resistance, etc. and an improved lamination characteristic toward a separator in using a separate separator due to adhesion characteristic of the polymer present in a large amount in the surface of the active layer. Therefore, the electrode having a porous active coating layer according to the present invention may exhibit very excellent characteristics in the assembly process of a battery such a winding process, a lamination process, etc. Also, the electrode having a porous active coating layer according to the present invention may have excellent ion conductivity since the heterogeneity of morphology toward a thickness direction enables the porosity of the active layer to be increased in a position inwards from its surface, thereby resulting in improvement of battery performances.

2) The electrode having a porous active coating layer according to the present invention may serve as a porous separator, and therefore the porous separator may not be used. As a result, the assembly process of the electrochemical device may be simple. Also, it is easy to adjust a thickness of a porous coating layer since the porous coating layer may be formed using a conventional coating method, and therefore it is possible to manufacture a porous coating layer in a form of a thick film, as well as a thin film having a thickness of 10 µm or less.

3) Also, both of the electrodes is not completely short-circuited because of the presence of an organic/inorganic composite porous active layer when the used porous separator is ruptured inside the battery, and the short-circuited area is not enlarged any more although a short-circuit phenomenon appears in the battery, resulting in improvement in the safety of the battery.

In the application of the present invention, the expression "heterogeneity of morphology toward a thickness direction in which a content ratio of binder polymer/inorganic particles present in a surface region of a porous active layer is higher than that of binder polymer/inorganic particles present inside the porous active layer" should be understood to include all aspects if the organic/inorganic composite separator of the present invention is formed so that a content ratio of binder polymer/inorganic particles present in a surface of a porous active layer is higher than that of binder polymer/inorganic particles present beneath (inside) the surface of the porous active layer. For example, by the expression, it is meant that the organic/inorganic composite separator of the present invention includes all porous active layers including a porous active layer formed so that the content ratio of the binder polymer/inorganic particles is linearly decreased toward a direction from a surface of the porous active layer to the electrode; a porous active layer formed so that the content ratio of the binder polymer/inorganic particles is non-linearly decreased toward a direction from a surface of the porous active layer to the electrode; a porous active layer formed so that the content ratio of the binder polymer/inorganic particles is non-continuously decreased toward a direction from a surface of the porous active layer to the electrode, etc.

In the application of the present invention, the content ratio of the binder polymer/inorganic particles should also be determined on the basis of the entire surface region of the porous active layer since the binder resin present in the surface region of the porous active layer may not be partially homogenously mixed with the inorganic particles.

Ones of major components in the electrode having a porous active coating layer according to the present invention are inorganic particles generally used in the art. The inorganic particles are the major components forming a porous active layer, and also serve to form micropores due to the presence of interstitial volumes among the inorganic particles. Also, the inorganic particles serve as a kind of a spacer for maintaining a physical shape of the coating layer.

The inorganic particles, used in the porous active coating layer formed on the electrode a according to the present invention, are stable in the electrochemical aspect, but the present invention is not particularly limited thereto. That is to say, the inorganic particles, which may be used in the present invention, is not limited if oxidation and/or reduction reactions do not take place within the operation voltage range (for example, 0~5V in the case of the a $Li/Li^+$ battery) of a battery to be applied. In particular, the used inorganic particles having ion conductivity may enhance ion conductivity in the electrochemical device, resulting in improved performances of the electrode having a porous active coating layer.

Further, when inorganic particles having a high dielectric constant are used, they can contribute to increasing dissociation degree of an electrolyte salt in a liquid electrolyte, such as a lithium salt, thereby improving ion conductivity of the electrolyte.

For these above reasons, the inorganic particles preferably include inorganic particles having a high dielectric constant of 5 or more, and more preferably 10 or more, inorganic particles having lithium conductivity or mixtures thereof. A non-limiting example of the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$ or mixtures thereof.

In particular, the above-described inorganic particles, for example $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT) and hafnia ($HfO_2$), has a high dielectric constant of 100 or more. The inorganic particles also have piezoelectricity so that an electric potential difference between both electrode surfaces can be generated in the presence of the generated charges when pressure is applied over a critical level. Therefore, the inorganic particles can prevent internal short circuit between both electrodes, thereby contributing to improving safety of a battery. Additionally, when such inorganic particles having a high dielectric constant are mixed with inorganic particles having lithium ion conductivity, synergic effects may be obtained.

As used herein, "inorganic particles having lithium ion conductivity" are referred to as inorganic particles containing lithium ions and having a capability of transferring lithium ions without storing lithium. The inorganic particles having lithium ion conductivity can conduct and move lithium ions due to defects in their particle structure, and thus can improve lithium ion conductivity and contribute to improving battery performance. A non-limiting example of such inorganic particles having lithium ion conductivity includes: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS$, $0<x<3$, $0<y<3$, $0<z<7$) such as $LiI$—$Li_2S$—$P_2S_5$, or mixtures thereof.

In the porous active coating layer formed on the electrode according to the present invention, it is possible to form micropores, and simultaneously adjust the pore size and porosity of the micropores by adjusting the sizes and contents of the inorganic particles and content of the binder polymer.

Although there is no particular limitation in size of the inorganic particles, the inorganic particles preferably have a size of 0.001-10 µm for the purpose of forming a coating layer having a uniform thickness and providing a suitable porosity. If the size is less than 0.001 µm, physical properties of the porous active layer cannot be controlled with ease since the inorganic particles have poor dispersibility. If the size is greater than 10 µm, the resultant porous active layer has an increasing thickness, resulting in degradation in mechanical properties. Furthermore, an excessively large size of the pores increases a possibility of the internal short circuit appearing during repeated charging/discharging cycles of a battery.

The binder polymer may include at least one type of polymer, for example, hydrophilic polymer, or two or more types of polymers having different material properties. When two or more types of polymers are used, the binder polymer may include a first polymer and a second polymer, the first binder polymer having higher polarity than that of the second binder polymer.

As one of the major components in the porous active layer having heterogeneity of morphology toward a thickness direction according to the present invention, a first binder polymer is preferably used as the binder polymer, the first binder polymer including together at least one functional group selected from the group consisting of carboxy, maleic anhydride and hydroxy; and at least one functional group selected from the group consisting of cyano and acrylate. More preferably, first binder polymers containing a hydroxy group and a cyano group together, such as cyanoethylpullulan, cyanoethylpolyvinylalcohol, cyanoethylcellulose, cyanoethylsucrose, are used alone or in combinations thereof. If a coating solution of the first binder polymer having two certain functional groups is used herein, the porous active coating layer having heterogeneity of morphology toward a thickness direction is easily formed by only a single coating process by means of control of phase inversion, and a cohesion force among the inorganic particles, an adhesion force between the porous active layer and the porous substrate, and a lamination characteristic toward a separator are further improved.

In particular, one of the very important characteristics is particularly the lamination of the porous active layer, formed on the electrode during the assembly process of a battery, to a porous separator in using a separate porous separator. The lamination to the separator is evaluated by measuring an adhesion force between the porous active layers, namely an adhesion force between two electrodes after an electrode having a porous active coating layer is attached to another separator at 100° C. under a pressure of 5.0 kgf/cm$^2$. The porous active layer, formed in the organic/inorganic composite separator of the present invention under the above-mentioned conditions, preferably has an adhesion force of 3 gf/cm or more and more preferably 5 gf/cm.

Also, it is not essential to use a binder polymer having ion conductivity, used in the porous active layer having heterogeneity of morphology toward a thickness direction of the present invention. However, when the used binder polymer has ion conductivity, it can further improve performances of an electrochemical device. Therefore, the binder polymer preferably has a dielectric constant as high as possible. Because a dissociation degree of a salt in an electrolyte solution depends on a dielectric constant of a solvent used in the electrolyte, the polymer having a higher dielectric constant can increase the dissociation degree of a salt in the electrolyte solution used in the present invention. The dielectric constant of the polymer may range from 1.0 to 100 (as measured at a frequency of 1 kHz), and is preferably 10 or more.

Also, the above mentioned first binder polymer is preferably used in combination with a second binder polymer having a solubility parameter of 17 to 27 MPa$^{1/2}$ in the aspect of electrochemical safety of the porous coating layer. Such a second binder polymer includes polymers having a functional group selected from the group consisting of halogen, acrylate, acetate and cyano. More particularly, an example of the second binder polymer includes polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, etc.

If the first binder polymer and the second binder polymer are used together in the porous active layer having heterogeneity of morphology toward a thickness direction according to the present invention, a content ratio of the first binder polymer:the second binder polymer ranges from 0.1:99.9 to 99.9:0.1, and more preferably from 20.0:80.0 to 80.0:20.0.

In the porous active coating layer formed on the electrode of the present invention, there is no particular limitation in a mixing ratio of inorganic particles to a binder polymer. However, the mixing ratio of inorganic particles to a binder polymer preferably ranges from 10:90 to 99:1, and more preferably ranges from 50:50 to 99:1. If the content of the inorganic particles is less than 10 parts by weight, interstitial volumes formed among inorganic particles may be decreased due to the presence of an excessively large amount of the polymer, thereby reducing the pore size and porosity of a coating layer, resulting in degradation in battery performance. If the content of the inorganic particles is greater than 99 parts by weight, an excessively low content of the polymer may cause the cohesion force among inorganic particles to be weakened, resulting in degradation in mechanical properties of the resultant porous active layer.

There is no particular limitation in thickness of the porous active coating layer formed on the electrode, but a thickness of the porous active coating layer may be, for example, adjusted to 0.01 and 100 μm in consideration of the performances of the battery. Thickness of a porous active coating layer in the cathode and the anode may be adjusted in an independent manner, respectively. Also, there are no particular limitations in pore size and porosity of the porous active coating layer, but the porous active coating layer preferably has a pore size of 0.001 to 10 μm and a porosity of 5 to 95%. The porous active layer may serve as a resistant layer if the pore size and the porosity of the porous active layer is less than 0.001 μm and 5%, respectively, while it may be difficult to maintain mechanical properties of the porous active layer if the pore size and the porosity of the porous active layer is greater than 150 μm and 95%, respectively.

The electrode having a porous active coating layer of the present invention further may include other additives as the components of the porous active coating layer, in addition to the inorganic particles and the binder polymer.

There is no particular limitation in selection of electrodes including the active layer having homogeneous composition morphology according to the present invention if the electrode may be used for the electrochemical device, and the electrodes may also be manufactured by applying a slurry of electrode active materials to an electrode collector and drying the applied slurry according to the conventional methods known to those skilled in the art.

Among the electrode active materials, a non-limiting example of cathode active materials may include any conventional cathode active materials that may be used in a cathode of a conventional electrochemical device, and particularly preferably includes lithium intercalation materials such as lithium manganese oxides, lithium cobalt oxides, lithium nickel oxides, lithium iron oxides or composite oxides thereof. Additionally, a non-limiting example of anode active materials may include any conventional anode active materials that may be used in an anode of a conventional electrochemical device, and particularly preferably include lithium intercalation materials such as lithium metal, lithium alloys, carbon, petroleum coke, activated carbon, graphite or other carbonaceous materials.

A non-limiting example of a cathode collector includes foil formed of aluminum, nickel or a combination thereof. A non-limiting example of an anode current collector includes foil formed of copper, gold, nickel, copper alloys or a combination thereof.

The porous active coating layer formed on the electrode according to the present invention has a plurality of pores formed therein. Here, the binder polymer preferably interconnects and fixes the inorganic particles, and the micropores are formed in the porous active coating layer due to the presence of interstitial volumes among the inorganic particles.

The electrode including a porous active layer having heterogeneity of composition morphology toward a thickness direction according to the present invention may be manufactured according to the following methods, but the present invention is not limited thereto.

As the first method, a method for manufacturing an electrode having a porous active coating layer is described, as follows. In this manufacturing method, the porous active coating layer is formed on the electrode so that a content ratio of binder polymer/inorganic particles can be non-continuously decreased from a surface of porous active layer to the porous substrate.

First, a binder polymer is dissolved in a solvent to form a polymer solution, and inorganic particles are added and dispersed in the polymer solution to prepare various coating solutions having different contents of the inorganic particles. At this time, kinds of the binder polymer and the inorganic particles in each of the coating solutions may be identical to or different from each other. A porous active layer having heterogeneity of morphology toward a thickness direction is prepared by repeatedly applying and drying each of the coating solutions onto a surface of a porous substrate with a thin thickness, wherein the binder polymer/inorganic particles have different content ratios in the coating solutions. Binder polymer/inorganic particles in a finally applied coating solution should have a sufficiently high content ratio to improve characteristics of a battery during an assembly process of the battery. Then, binder polymer/inorganic particles in the coating solution, applied beneath the finally applied coating solution, should have a lower content ratio than binder polymer/inorganic particles in the coating solution applied in a surface of the porous active layer. Meanwhile, polymer/inorganic particles in the coating solution, with which a surface of the porous substrate is coated so that the surface can be in contact to the coating solution, may have a higher content ratio than binder polymer/inorganic particles in the coating solution of the intermediate layer, if necessary. Such a non-continuous multiple coating layer may be formed of 2 layers, 3 layers or more, and the entire thickness of the multiple coating layer should be controlled within the known range without degrading performances of the electrode.

All conventional binder polymers may be used as the binder polymer capable of being used to form the above-mentioned multiple coating layer, as long as they can be used to form a porous active layer. In particular, the binder polymer is preferably gelled when swelled with a liquid electrolyte, thereby to shows a high degree of swelling. Therefore, it is preferred to use a binder polymer having a solubility parameter of 15 to 45 $MPa^{1/2}$, and more preferably a solubility parameter of 15 to 25 $MPa^{1/2}$ and 30 to 45 $MPa^{1/2}$. Accordingly, hydrophilic polymers having a large number of polar groups are more advisable as the binder polymer compared to hydrophobic polymers such as polyolefin polymers. The binder polymer cannot be swelled sufficiently in a conventional aqueous electrolyte solution for a battery if the solubility parameter of the binder polymer is less than 15 $MPa^{1/2}$ or greater than 45 $MPa^{1/2}$.

As the second method, there is a method for forming a porous active layer having heterogeneity of morphology toward a thickness direction through only a single coating process.

First, the above-mentioned first binder polymer is dissolved in a solvent to prepare a first polymer solution (S1). The first binder polymer includes together at least one functional group selected from the group consisting of carboxy, maleic anhydride and hydroxy; and at least one functional group selected from the group consisting of cyano and acrylate. Therefore, it is possible to improve physical properties of the resultant electrode having a porous active coating layer and to control the phase inversion.

Subsequently, inorganic particles are added and dispersed in a first binder polymer solution (S2). It is preferred to use solvents having a similar solubility parameter to the binder polymer, as well as a low boiling point. This is why the solvent is uniformly mixed with the polymer and easily removed in the subsequent process. A non-limiting example of the solvent that may be used include, but is not limited to, acetone, tetrahydrofuran, methylene chloride, chloroform, dimethylformamide, N-methyl-2-pyrrolidone (NMP), cyclohexane, water and mixtures thereof. It is preferred to perform a step of pulverizing inorganic particles after adding the inorganic particles to the polymer solution. At this time, the time required for pulverization is suitably 1-20 hours, and the particle size of the pulverized particles ranges preferably from 0.001 and 10 μm, as described above. Conventional pulverization methods may be used, and a method using a ball mill is particularly preferred. There are no particular limitations in composition of the mixture composed of the inorganic particles and the polymer. Therefore, it is possible to control thickness, pore size and porosity of the finally produced porous active layer. That is to say, the porosity of the porous active layer is increased with increase in a ratio (ratio=I/P) of inorganic particles (I) to a polymer (P), indicating that the thickness of the electrode is improved in the same solid content (weight of inorganic particles+weigh of a binder polymer). Also, the pore size of the porous active layer may be increased with an increasing ability to form pores among the inorganic particles. At this time, the pore size of the electrode is increased since an interstitial distance among inorganic materials is increased with increase in a size (a diameter) of the inorganic particles.

Then, an electrode is coated with a solution of a first binder polymer having inorganic particles dispersed therein, and the coated electrode is dried. Here, the heterogeneity of morphology toward a thickness direction is determined according to components and coating conditions of the binder polymer. That is to say, the heterogeneity of morphology in the porous active layer is formed according to the components and the suitable coating condition (in particular, moisture) of the binder polymer. If a polymer having a high polarity, for example the first binder polymer, is mixed with inorganic materials to prepare a mixed solution of the binder polymer/inorganic particles and the porous substrate is then coated with the mixed solution under a suitable moisture condition, the mixed polymer solution goes through phase inversion, which allows the polymer having a high polarity to appear in a relatively larger amount in a surface of the porous active layer. That is to say, a relative density of the binder polymer is gradually decreased from a surface of the active layer toward a thickness direction. At this time, the moisture condition ranges from 5 to 80% (a relative moisture, a room temperature), and preferably from 20 to 50%. The heterogeneity of morphology in the active layer is not accomplished if the moisture condition is less than 5%, while the formed active layer has a very loose adhesion force and an excessively high porosity if the moisture condition is greater than 80%, resulting in easy peeling of the active layer.

In order to improve electrochemical stability of a porous active layer to be formed, it is preferred to further dissolve a second binder polymer having a solubility parameter of 17 to 27MPa$^{1/2}$ in the above-mentioned first binder polymer solution. Specific kinds and preferred content ratios of the first binder polymer and the second binder polymer are the same as described above.

As the method for coating a porous substrate with the solution of the binder polymer having inorganic particles dispersed therein, conventional methods well known in the art may be used. For example, the conventional methods include a dip coating, a die coating, a roll coating, a comma coating or combination thereof. Also, the porous active layer may be selectively formed on only one side or both sides of the electrode, and be selectively applied to an anode, a cathode or both the cathode and the anode.

The electrode having a porous active coating layer of the present invention, prepared thus, may be used as an electrode of an electrochemical device, preferably a lithium secondary battery. At this time, if a polymer, which can be swelled by uptake of liquid electrolytes, is used as the component of the binder polymer, the polymer is gelled by reaction of the polymer to the electrolyte solution injected after the assemblage of a battery.

Also, the present invention provides an electrochemical device including a cathode, an anode and an electrolyte, wherein the cathode or the anode, and both electrodes are the electrodes having a porous active coating layer having the above-mentioned heterogeneity of morphology.

In the electrochemical device according to the present invention, the porous active coating layer formed on the electrode may serve as a separator, and therefore the separator, used in the prior art, is not necessarily required for the electrochemical device. However, the porous active coating layer may be assembled with a porous separator such as a polyolefin separator according to the uses and characteristics of the electrochemical device.

The electrochemical devices include any devices in which electrochemical reactions may occur, and a specific example of the electrochemical devices includes all kinds of primary batteries, secondary batteries, fuel cells, solar cells or capacitors. In particular, it is preferred to use lithium secondary batteries among the secondary batteries including a lithium metal secondary battery, a lithium ion secondary battery, a lithium polymer secondary battery or a lithium ion polymer secondary battery.

The electrochemical device may be manufactured according to the conventional methods widely known in the art. According to one embodiment of the present invention, the electrochemical device may be manufactured by assembling the electrode having a porous active coating layer using a method such as winding or stacking (namely, lamination), etc. and injecting an electrolyte solution. It is apparent that the electrode may be selectively assembled with a porous separator in this process.

The electrolyte solution that may be used for the electrochemical device in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents a salt containing an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte solution that may be used in the present invention is not limited to the above examples.

The electrolyte solution may be injected in a suitable step during the manufacturing process of a battery, according to the manufacturing process and desired properties of a final product. In other words, the electrolyte solution may be injected before the assemblage of a battery or in a final step of the assembly process of a battery.

In addition to the general winding process, the process, used for applying the electrode of the present invention to a battery, may include a stacking process and a folding process. In particular, the electrode of the present invention has an advantage that the electrode may be easily used during the assembly process of a battery since a binder polymer is present in a relatively large amount in a surface region of an active layer. At this time, an adhesion force may be controlled according to the contents of main components, for example inorganic particles and a polymer, or the physical properties of the polymer, and the used separator is easily attached to electrode of the present invention especially if the above-mentioned first binder polymer is used as the binder polymer.

EXAMPLES

Hereinafter, preferred embodiments of the present invention will be described in detail for better understandings, with reference to the accompanying drawings. However, the description proposed herein is just a preferable example for the purpose of illustrations only, not intended to limit the scope of the invention.

Examples 1 to 7

Preparation of Electrode Having a Porous Active Coating Layer, and Lithium Secondary Battery Example 1

1-1. Preparation of Electrode (Preparation of Anode)

To N-methyl-2-pyrrolidone (NMP) as a solvent, 96% by weight of carbon powder as an anode active material, 3% by weight of PVDF (polyvinylidene fluoride) as a binder and 1% by weight of carbon black as a conductive agent were added to prepare a mixed slurry for an anode. A Cu thin film having a thickness of 10 μm as an anode collector was coated with the missed slurry and dried to prepare an anode. Then, the anode was subject to a roll press.

(Preparation of Cathode)

To N-methyl-2-pyrrolidone (NMP) as a solvent, 92% by weight of lithium cobalt composite oxide ($LiCoO_2$) as a cathode active material, 4% by weight of carbon black as a conductive agent and 4% by weight of PVDF (polyvinylidene fluoride) as a binder were added to prepare a mixed cathode slurry. An Al thin film having a thickness of 20 μm as a cathode collector was coated with the mixed cathode slurry and dried to prepare a cathode. Then, the cathode was subject to a roll press.

1-2. Preparation of Electrode Having a Porous Active Coating Layer [(PVdF-CTFE/Cyanoethylpullulan)/BaTiO$_3$]

A polyvinylidene fluoride-chlorotrifluoroethylene copolymer (PVdF-CTFE) and cyanoethylpullulan were added to acetone at contents of 10% by weight and 2% by weight, respectively, and dissolved at 50° C. for about 12 hours to prepare a binder polymer solution. A BaTiO$_3$ powder was added to the prepared polymer solution to a weight ratio of 20/80 weight ratio of the binder polymer/BaTiO$_3$, and then the BaTiO$_3$ powder was ground and dispersed for at least 12 hours using a ball mill, thereby to prepare a slurry. A particle diameter (particle size) of BaTiO$_3$ in the slurry prepared thus may be adjusted according to the size of a bid used in the ball mill and the time used in the ball mill, but the BaTiO$_3$ powder was ground to a particle diameter of about 400 nm to prepare a slurry in this Example 1. The cathode and anode (porosity of 45%) prepared according to the above method was coated with the prepared slurry under a moisture condition of 30% relative humidity using a dip coating process. At this time, a coating thickness of the cathode or the anode was adjusted to a thickness of about 10 μm. An average size of pores in the porous active coating layer formed on the electrode was about 0.4 μm, and its porosity was about 57%.

1-3. Preparation of Battery

The electrode having a porous active coating layer, prepared as described above, was stacked to form a battery assembly. Then, an electrolyte solution (ethylene carbonate (EC)/ethylene methyl carbonate (EMC)=1/2 (by volume ratio) containing 1 M of lithium hexafluorophosphate (LPF$_6$)) was injected into the battery assembly to prepare a lithium secondary battery.

Example 2

Example 1 was repeated in the same manner to prepare an electrode having a porous active coating layer [(PVdF-CTFE/cyanoethylpolyvinylalcohol)/BaTiO$_3$] and a lithium secondary battery having the electrode, except that cyanoethylpolyvinylalcohol was used instead of cyanoethylpullulan.

Example 3

Example 1 was repeated in the same manner to prepare an electrode having a porous active coating layer [(PVdF-HFP/Cyanoethylpullulan)/BaTiO$_3$] and a lithium secondary battery having the electrode, except that PVdF-HFP was used instead of PVdF-CTFE.

Example 4

Example 1 was repeated in the same manner to prepare an electrode having a porous active coating layer [(PVdF-HFP/Cyanoethylpullulan)/PMNPT] and a lithium secondary battery having the electrode, except that a PMNPT powder was used instead of the BaTiO$_3$ powder.

Example 5

Example 1 was repeated in the same manner to prepare an electrode having a porous active coating layer [(PVdF-HFP/Cyanoethylpullulan)/BaTiO$_3$—Al$_2$O$_3$] and a lithium secondary battery having the electrode, except that a mixed powder of BaTiO$_3$ and Al$_2$O$_3$ (a weight ratio: 90/10) was used instead of the BaTiO$_3$ powder.

Example 6

Example 1 was repeated in the same manner to prepare an electrode having a porous active coating layer [(PVdF-CTFE/Cyanoethylpullulan)/LiTi$_2$(PO$_4$)$_3$] and a lithium secondary battery having the electrode, except that a lithium titanium phosphate (LiTi$_2$(PO$_4$)$_3$) powder was used instead of the BaTiO$_3$ powder.

Example 7

Example 1 was repeated in the same manner to prepare a lithium secondary battery, except that a polyolefin separator having a thickness of 20 μm was additionally used to assemble a battery.

Comparative Example 1

Example 1 was repeated in the same manner to prepare a lithium secondary battery, except that the battery was assembled by interposing a polyolefin (PE) separator between the cathode and the anode which do not have the porous active coating layer.

Analysis of Physical Properties of Electrode Having a Porous Active Coating Layer In order to analyze a surface of the electrode prepared according to the present invention, and a cross section of the active layer, a test was carried out, as described in the following.

The electrode having a porous active coating layer [(PVdF-CTFE/cyanoethylpullulan)/BaTiO$_3$] prepared in Example 1 was used as a test sample. Also, an electrode having a porous active coating layer was used as a control, the electrode being formed using PVdF-CTFE alone instead of the 2-component binder polymer prepared in Example 1 so as not to show heterogeneity of morphology toward a thickness direction.

Figure 2:
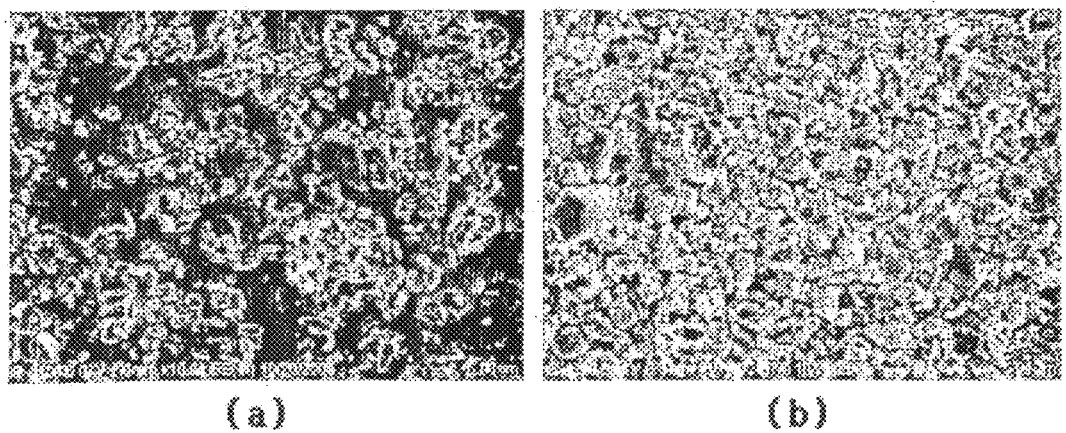
FIG. 2 is a photograph, taken by a scanning electron microscope (SEM), showing the electrode having a porous active coating layer. Here.

The surfaces of the electrodes were analyzed using a scanning electron microscope (SEM). As a result, it was revealed that the electrode of Example 1 includes a porous active layer and an electrode which is a support, wherein pores having a diameter of 1 μm or less are present uniformly in both of the porous active layer and the support (see FIG. 2A and FIG. 3A). Unlike the control separators in which the inorganic materials are mainly observed on the surfaces (see FIG. 2B, FIG. 3B), it was seen that the inorganic particles and the polymer layer are present on the surface of the porous active coating layer formed on the electrode of Example 1 (see FIG. 2A).

Figure 3:
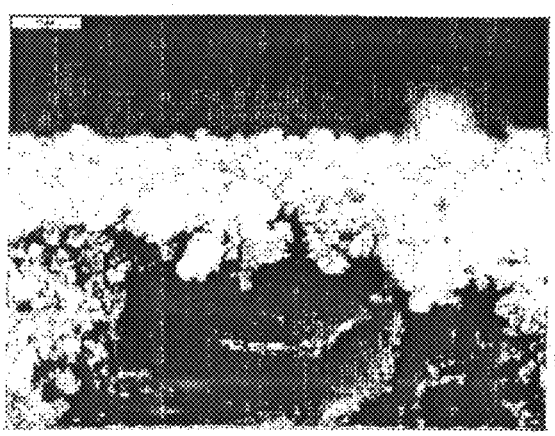
FIG. 3 is a photograph, taken by a scanning electron microscope (SEM), showing a cross-sectional view of the electrode having a porous active coating layer. Here.
Figure 3:

FIG. 3 shows an SEM photographic result showing cross sections of the electrode prepared in Example 1 and the control electrode, respectively. It was seen that the polymer is present in a relatively higher amount in a surface of the active layer than inside the porous active layer in the case of the electrode of Example 1 (see FIG. 3A). On the contrary, it was seen that the control electrode has a homogenous composition in the surface as well as inside the porous active layer (see FIG. 3B). From the photographic results of the surfaces and the cross sections of the above-mentioned electrodes, it was revealed that the electrode having a porous active coating layer according to the present invention has a porous active layer showing morphology heterogeneity, namely a morphology gradient, of a binder polymer and inorganic particles toward a thickness direction.

Meanwhile, in order to objectively evaluate a lamination characteristic toward the separator in the electrode, two electrodes were attached to each other at 100° C. under a pressure of 5.0 kgf/cm$^2$ to measure an adhesion force between the electrodes. As a result, it was revealed that an adhesion force between the control electrodes is proven to be 2 gf/cm or less. Actually, the control electrode was not easily laminated to the separator. On the contrary, it was revealed that an adhesion force between the electrodes of Example 1 is high (5 gf/cm or more). Actually, the electrode of Example 1 has a good lamination characteristic toward the separator.

Figure 4:
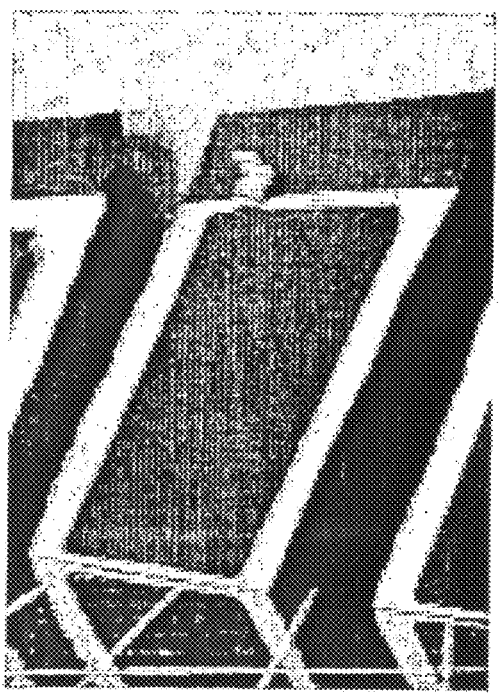
FIG. 4 is a photograph, taken after the lamination test toward a porous separator in the electrode having a porous active coating layer. Here.
Figure 4:

FIG. 4 is a photograph, taken after the lamination test toward a porous separator in the electrode having a porous active coating layer. Here, FIG. 4A is a photograph showing a lamination test result of the electrode having a porous active coating layer prepared in Example 1, wherein the porous active coating layer has heterogeneity of morphology toward a thickness direction, and FIG. 4B is a photograph showing a lamination test result of the conventional control electrode having a porous active coating layer. It was revealed that the electrode of Example 1 according to the present invention has an excellent lamination characteristic toward the lamination characteristic toward, compared to the control electrode.

Performance Evaluation of Lithium Secondary Battery

The lithium secondary batteries including the electrode prepared in the present invention were evaluated for a high rate discharge characteristic, as follows.

The lithium secondary batteries prepared in Examples 1 to 6 were used herein, and the battery prepared in Comparative example 1 was used as the control.

Each of the batteries having a battery capacity of 760 mAh was subject to cycling at discharge rates of 0.5 C, 1 C and 2 C, respectively. The discharge capacities of the batteries are listed in the following Table 1, wherein the capacities are expressed on the C-Rate basis.

From the experimental results, it was revealed that the batteries according to Examples 1 to 6, which contain the electrodes having a porous active coating layer having a morphology gradient according to the present invention, shows an excellent high-rate discharge (C-rate) characteristic until the discharge rate of 2 C, which is comparable to the high-rate discharge (C-rate) characteristic of the battery prepared in Comparative example 1 including the conventional electrode (see Table 1).

TABLE 1

| Discharge Rate | Example 1 | Example 2 | Example 3 | Example 4 | Example 5 | Example 6 | Comparative example 1 |
|---|---|---|---|---|---|---|---|
| 0.5C | 753 | 754 | 753 | 752 | 752 | 751 | 756 |
| 1C | 745 | 744 | 742 | 741 | 743 | 738 | 745 |
| 2C | 690 | 691 | 688 | 689 | 691 | 685 | 693 |

INDUSTRIAL APPLICABILITY

As described above, the electrode having a porous active coating layer according to the present invention may be useful to enhance peeling and scratch resistances of the porous active layer and improve a lamination characteristic toward the porous separator by introducing a porous active layer onto the electrode, wherein the porous active layer has heterogeneity of morphology toward a thickness direction in which a content ratio of the binder polymer/inorganic particles present in a surface layer is higher than that of the binder polymer/inorganic particles present inside the surface layer. Accordingly, the stability and performances of a battery can be improved at the same time since the detachment of the inorganic particles from the porous active layer may be reduced during the assembly process of the electrochemical device.

What is claimed is:

1. An electrode having a porous active coating layer, comprising:
   (a) an electrode having an electrode collector coated with electrode active materials; and
   (b) a porous active coating layer formed on at least one surface of the electrode and having a mixture of a plurality of inorganic particles and a binder polymer formed thereon;
   wherein:
   (i) the binder polymer comprises a mixture of first and second binder polymers, the first binder polymer selected from the group consisting of cyanoethylpullulan, cyanoethylpolyvinylalcohol, cyanoethylcellulose, cyanoethylsucrose and mixtures thereof, and the second binder polymer selected from the group consisting of polyvinylidene fluoride-co-hexafluoropropylene, polyvinylidene fluoride-co-trichloroethylene, polyvinylpyrrolidone, polyvinylacetate, polyethylene-co-vinyl acetate, polyimide, polyethylene oxide, cellulose acetate, cellulose acetate butyrate, cellulose acetate propionate and mixtures thereof;
   (ii) the first binder polymer having higher polarity than that of the second binder polymer; and
   (iii) the porous active layer shows heterogeneity of composition morphology toward a thickness direction in which a content ratio of the binder polymer/inorganic particles present in a surface region of the porous active layer is higher than that of the binder polymer/inorganic particles present inside the porous active layer.

2. The electrode having a porous active coating layer according to claim 1, wherein the binder polymer interconnects and fixes the inorganic particles and the pores are formed in the porous active coating layer due to the presence of interstitial volumes among the inorganic particles.

3. The electrode having a porous active coating layer according to claim 1, wherein the inorganic particles are selected from the group consisting of inorganic particles having a dielectric constant of 5 or more, inorganic particles having lithium ion conductivity, and a mixture thereof.

4. The electrode having a porous active coating layer according to claim 3, the inorganic particles having a dielectric constant of 5 or more are selected from the group consisting of $BaTiO_3$, Pb $(Zr,Ti)O_3$ (PZT), $Pb_{1-x}La_xZr_{1-y}Ti_yO_3$ (PLZT), PB $(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, and mixtures thereof.

5. The electrode having a porous active coating layer according to claim 4, wherein the inorganic particles having a dielectric constant of 5 or more are piezoelectric inorganic particles selected from the group consisting of $BaTiO_3$, Pb (Zr,Ti)$O_3$ (PZT), $Pb_{1-x}La_xZr_{1-y}Ti_yO_3$ (PLZT), PB($Mg_3Nb_{2/3}$) $O_3$—$PbTiO_3$ (PMN-PT), hafnia ($HfO_2$), and mixtures thereof.

6. The electrode having a porous active coating layer according to claim 3, wherein the inorganic particles having lithium ion conductivity are selected from the group consisting of lithium phosphate ($Li_3PO_4$), lithium titanium phosphate ($Li_xTi_y(PO_4)_3$, $0<x<2$, $0<y<3$), lithium alumium titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides ($Li_xN_y$, $0<x<4$, $0<y<2$), $SiS_2$ ($Li_xSi_yS_z$, $0<x<3$, $0<y<2$, $0<z<4$) type glass, $P_2S_5$ ($Li_2P_yS_z$, $0<x<3$, $0<y<3$, $0<z<7$) type glass, and mixtures thereof.

7. The electrode having a porous active coating layer according to claim 1, wherein the inorganic particles have a particle diameter of 0.001 to 10 μm.

8. The electrode having a porous active coating layer according to claim 1, wherein the binder polymer is swelled with an electrolyte solution to be used to form a gel polymer electrolyte.

9. The electrode having a porous active coating layer according to claim 1, wherein the porous active coating layer has a thickness of 0.01 to 100 μm, a pore size of 0.001 to 10 μm and a porosity of 5 to 95%.

10. An electrochemical device comprising a cathode, an anode and electrolytes, wherein the cathode or the anode, and both electrodes are the electrodes having a porous active coating layer as defined in claim 1.

11. The electrochemical device according to claim 10, further comprising a porous separator.

12. The electrochemical device according to claim 10, wherein the electrochemical device is a lithium secondary battery.

* * * * *